(12) United States Patent
Lawn

(10) Patent No.: US 10,876,516 B2
(45) Date of Patent: Dec. 29, 2020

(54) FLUID MACHINE AND POWER GENERATION DEVICE

(71) Applicant: JAPAN FUDO INDUSTRY Inc., Kurume (JP)

(72) Inventor: Joshua Lawn, Funabashi (JP)

(73) Assignee: Japan Fudo Industry Inc., Kurume (JP)

( * ) Notice: Subject to any disclaimer, the term of this patent is extended or adjusted under 35 U.S.C. 154(b) by 0 days.

(21) Appl. No.: 16/307,229

(22) PCT Filed: Oct. 19, 2017

(86) PCT No.: PCT/IB2017/056494
§ 371 (c)(1),
(2) Date: Dec. 5, 2018

(87) PCT Pub. No.: WO2018/037394
PCT Pub. Date: Mar. 1, 2018

(65) Prior Publication Data
US 2019/0293047 A1    Sep. 26, 2019

(30) Foreign Application Priority Data

Aug. 22, 2016   (JP) ................................ 2016-162074

(51) Int. Cl.
*F03D 1/02*         (2006.01)
*F03D 15/00*        (2016.01)
(Continued)

(52) U.S. Cl.
CPC ............ *F03D 1/025* (2013.01); *F03B 17/061* (2013.01); *F03D 15/00* (2016.05); *F16H 48/08* (2013.01);
(Continued)

(58) Field of Classification Search
CPC ........ F03D 1/025; F03D 15/00; F03B 17/061; F16H 48/08; F05B 2210/16;
(Continued)

(56) References Cited

U.S. PATENT DOCUMENTS

2006/0153672 A1*  7/2006  Davis ................... F03D 7/0208
                                                    415/4.2
2008/0056897 A1*  3/2008  Anderson ............. B64C 27/021
                                                    416/128
(Continued)

FOREIGN PATENT DOCUMENTS

CN          103216387 A       7/2013
GB            2514526 A      12/2014
(Continued)

OTHER PUBLICATIONS

International Search Report issued in International Application No. PCT/IB2017/056494, dated Dec. 19, 2017.
(Continued)

*Primary Examiner* — Nathaniel E Wiehe
*Assistant Examiner* — Eric A Lange
(74) *Attorney, Agent, or Firm* — Knobbe Martens Olson & Bear LLP

(57) ABSTRACT

A fluid machine including a rotating shaft that extends parallel to a power generation shaft of a power generation unit, and that has an end coupled to the power generation shaft; a multiple rotors that are provided on the rotating shaft so as to be able to rotate in a circumferential direction of the rotating shaft, and that are arranged so as to be spaced in a rotational axis direction parallel to the axis of the rotating shaft; and a differential mechanism that is provided between a pair of rotors lying adjacent to each other in the rotational
(Continued)

axis direction, and that combines the rotational force from each of the pair of rotors and transmits the rotational force to the rotating shaft.

6 Claims, 5 Drawing Sheets

(51) Int. Cl.
    *F16H 48/08*     (2006.01)
    *F03B 17/06*     (2006.01)

(52) U.S. Cl.
    CPC ... *F05B 2210/16* (2013.01); *F05B 2240/2213* (2013.01); *F05B 2260/40311* (2013.01); *Y02E 10/72* (2013.01)

(58) Field of Classification Search
    CPC .... F05B 2240/2213; F05B 2260/40311; Y02E 10/721; Y02E 10/722
    See application file for complete search history.

(56) References Cited

U.S. PATENT DOCUMENTS

2010/0225119 A1    9/2010   Micu
2012/0074712 A1    3/2012   Bursal

FOREIGN PATENT DOCUMENTS

JP       05-231297 A     9/1993
JP       2007-321659 A   12/2007
JP       2013-002354 A    1/2013

OTHER PUBLICATIONS

Office Action in Japanese Patent Application No. 2016-162074 dated Apr. 28, 2020.

* cited by examiner

FLUID MACHINE AND POWER GENERATION DEVICE

TECHNICAL FIELD

The present invention relates to a fluid machine and a power generation device.

Priority is claimed on Japanese Patent Application No. 2016-162074, filed Aug. 22, 2016, the content of which is incorporated herein by reference.

BACKGROUND ART

Conventionally, the wind power generation unit described in the below-indicated Patent Document 1 has been known. This wind power generation unit comprises a plurality of front blades that are positioned upwind and rotated by wind power; a plurality of rear blades that are positioned downwind and rotated by the remaining wind power; and a differential apparatus for combining the rotational force transmitted from the front blades and the rotational force transmitted from the rear blades to turn a power generator. This wind power generation unit further comprises a tower, and a wind turbine pedestal supported by the tower. The differential apparatus and the power generator are provided above the wind turbine pedestal.

RELATED LITERATURE

Patent Literature

Patent Document 1
 JP 5-231297 A

SUMMARY OF INVENTION

Technical Problem

However, in the aforementioned conventional wind power generation apparatus, the differential apparatus is provided between the front blades and the rear blades, directly above the tower, so the power generator must be offset horizontally from the direct center of the tower. For this reason, it is difficult to apply, for example, to a so-called passive-yaw type wind power generation unit in which the orientation of the blades changes passively (swings around) in accordance with the wind direction.

The present invention was made in consideration of the aforementioned circumstances, and has the purpose of providing a fluid machine that can be employed in various types of power generation apparatus.

Solution to Problem

The present invention proposes the below-indicated means for solving the aforementioned problems.
(1) The fluid machine according to one embodiment of the present invention comprises a rotating shaft that extends parallel to a power generation shaft of a power generation unit, and that has an end thereof coupled to the power generation shaft; a plurality of rotors that are provided on the rotating shaft so as to be able to rotate in a circumferential direction of the rotating shaft, and that are arranged so as to be spaced in a rotational axis direction parallel to the axis of the rotating shaft; and a differential mechanism that is provided between a pair of rotors lying adjacent to each other in the rotational axis direction, and that combines the rotational force from each of the pair of rotors and transmits the rotational force to the rotating shaft.

In this case, the rotational force from each of the pair of rotors can be efficiently transmitted, via the differential mechanism and the rotating shaft, to the power generation shaft without depending on the rotation speed of each rotor. At this time, by transmitting the rotational force from each rotor to the power generation shaft of a common power generation unit, the load (rotation resistance) from the power generation shaft that acts on each rotor can be kept low. As a result thereof, it is possible to achieve efficient power generation by means of the power generation unit.

Additionally, the differential mechanism is provided between the pair of rotors, the rotating shaft extends parallel to the power generation shaft, and an end of the rotating shaft is coupled to the power generation shaft. Therefore, this fluid machine can be employed in, for example, a so-called passive-yaw type power generation apparatus in which the fluid machine that has received kinetic energy from a fluid passively swings around in accordance with the direction of the fluid. Furthermore, for example, it is possible to employ this fluid machine an attachment in which the entire fluid machine is appended to the power generation shaft in an existing power generation apparatus. Thus, this fluid machine can be employed in various types of power generation apparatus.

(2) The fluid machine as in (1) above may employ a structure wherein the differential mechanism comprises a transmission shaft that protrudes from the rotating shaft in the radial direction of the rotating shaft; a first gear that is provided on the transmission shaft so as to be able to rotate in a circumferential direction of the transmission shaft; and a pair of second gears that are provided so as to sandwich the transmission shaft in the rotational axis direction and are respectively fixed to the pair of rotors, and that mesh with the first gear to transmit the rotational force from each of the pair of rotors to the transmission shaft.

In this case, when a rotor rotates, the rotational force of the rotor is transmitted to the rotating shaft via a second gear, a first gear and the transmission shaft.

When the rotation speeds of the pair of rotors are the same, for example, during startup, the transmission shaft transmits the rotational force of the rotating shaft without the first gear turning. Therefore, compared to the case in which there is just one rotor rather than a pair, it is possible to transmit nearly twice the rotational force to the rotating shaft. As a result thereof, even if the kinetic energy of the fluid received by the rotors is low, the rotors can more easily begin to turn. Therefore, this fluid machine is provided with good startup properties.

On the other hand, when the rotation speeds of the pair of rotors are different, for example, during high-speed rotation, the transmission shaft transmits rotational force to the rotating shaft with the first gear rotating in the circumferential direction of the transmission shaft. Therefore, it is possible to keep the pair of rotors from affecting the rotation speeds of each other. In other words, the pair of rotors can be rotated at different rotation speeds in accordance with the kinetic energy received from the fluid by each rotor, with little energy loss. As a result thereof, it is possible to transmit a large rotational force to the rotating shaft.

(3) The fluid machine as in (1) or (2) above may employ a structure wherein the plurality of rotors rotate in the same direction upon receiving kinetic energy from a fluid.

In this case, compared to the case in which the plurality of rotors counter-rotate, there is no need to provide, for example, further mechanisms for counter-rotation, so the structure can be simplified, and structures that are of the same shape and the same size (for example, common clockwise rotors) can be employed as the plurality of rotors. As a result thereof, the cost can be reduced and the ease of maintenance can be improved.

(4) The fluid machine as in any one of (1) to (3) above may employ a structure wherein each of the plurality of rotors comprise a blade that receives kinetic energy from a fluid, and a hub to which the blade is fixed; and the pair of rotors are arranged so that the blades of the respective rotors sandwich both hubs in the rotational axis direction.

In this case, the plurality of rotors each comprise a blade and a hub. Therefore, the number of blades on each rotor can be reduced while ensuring that there are a certain number of blades in total in the fluid machine overall. Therefore, the rotational force from each of the plurality of rotors can be transmitted to the power generation shaft via the differential mechanism (effect due to ensuring that there are a certain number of blades in total in the fluid machine overall), while also providing this fluid machine with good startup properties. Furthermore, it can be made easier to raise the rotation speed during high-speed rotation of the rotors (effect due to reducing the number of blades in each rotor).

Additionally, the pair of rotors are arranged so that the blades of the respective rotors sandwich both hubs in the rotational axis direction. Therefore, the blades of the pair of rotors can be separated by a greater distance in the rotational axis direction. As a result thereof, for example, contact between the blades can be more easily prevented.

(5) The fluid machine as in any one of (1) to (4) above may employ a structure further comprising a cover that covers the differential mechanism and that is fixed to one of the pair of rotors and separated from the other.

In this case, the cover is fixed to one of the pair of rotors and separated from the other. Therefore, it is possible, for example, to prevent unexpected interference between the cover and the rotors, while the cover protects the differential mechanism.

(6) A power generation apparatus according to one embodiment of the present invention comprises the fluid machine according to any one of (1) to (5) above; and a power generation unit comprising the power generation shaft to which the end of the rotating shaft is coupled.

In this case, the power generation apparatus comprises the fluid machine, and can therefore generate power with high efficiency.

(7) The power generation apparatus according to (6) above may employ a structure further comprising a support portion that supports the power generation unit so as to be able to rotate about a yaw axis extending in a direction intersecting the axis of the power generation shaft; and the fluid machine, receiving kinetic energy from the fluid, passively swings around in accordance with the direction of the fluid.

In this case, the power generation apparatus has a so-called passive-yaw type structure comprising the support portion, so it is possible to obtain advantages such as cost, ease of maintenance and durability in comparison to so-called active-yaw type structures.

Advantageous Effects of Invention

According to the present invention, it is possible to provide a fluid machine that is able to be employed in various types of power generation apparatus.

DESCRIPTION OF EMBODIMENTS

Figure 1:
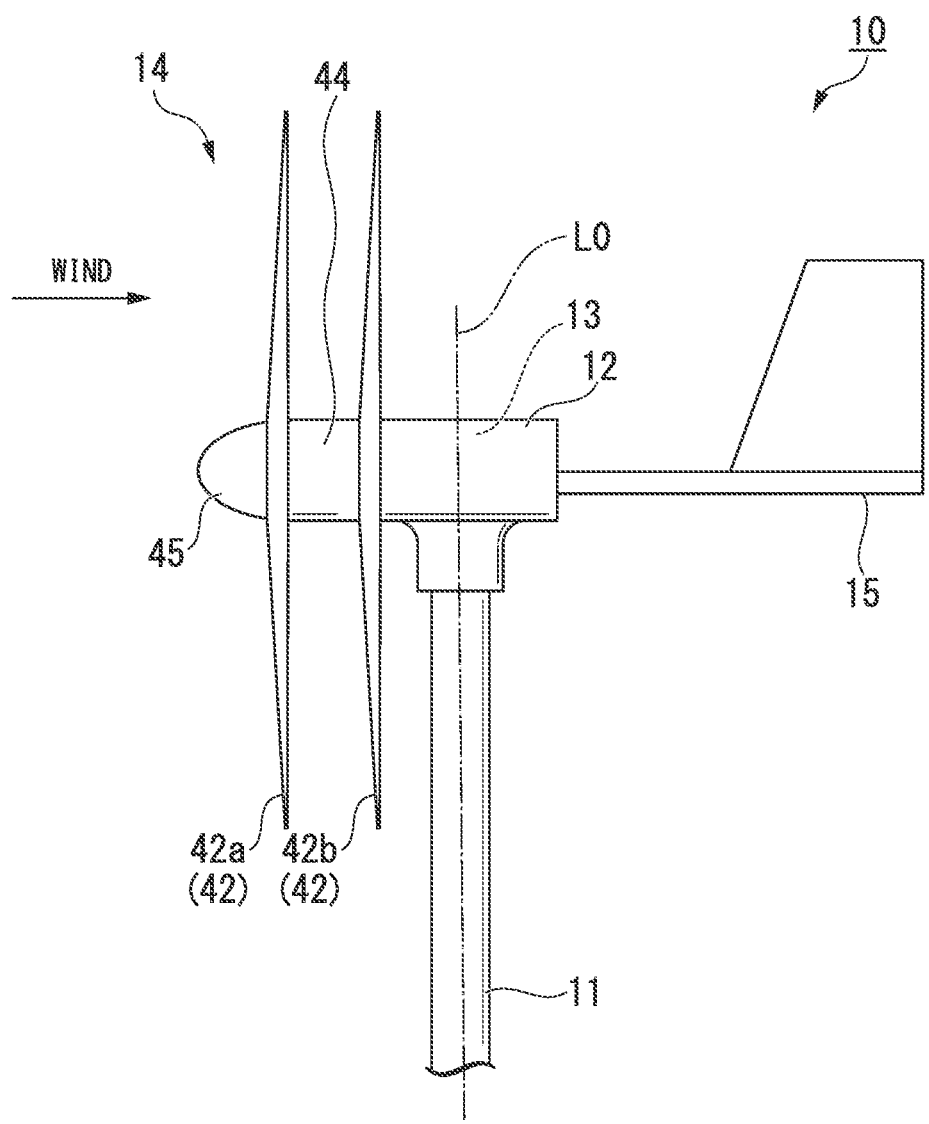
FIG. 1 is a side view of a power generation apparatus according to an embodiment of the present invention.

Hereinbelow, a power generation apparatus according to an embodiment of the present invention will be explained by referring to the drawings.

Figure 2:
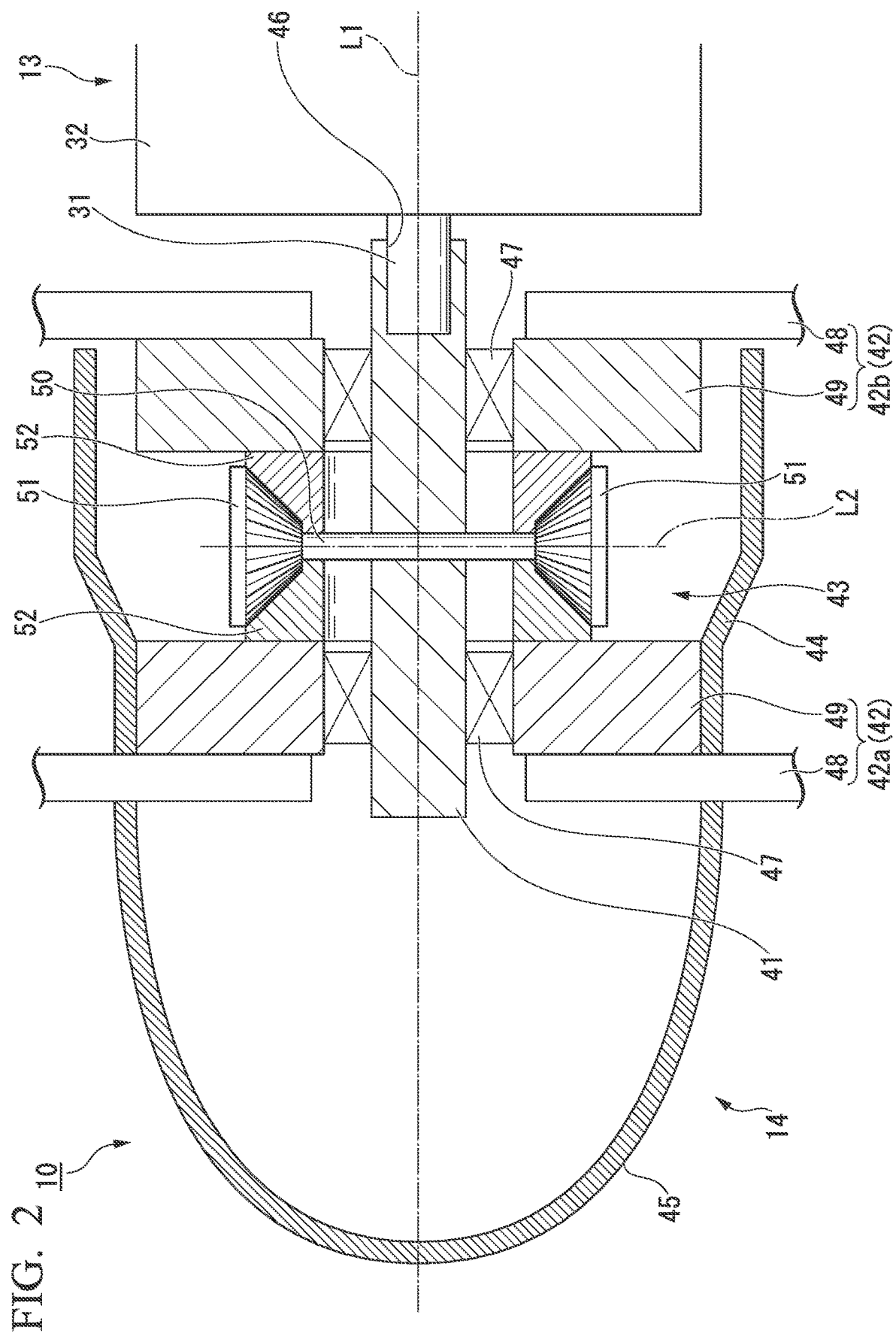
FIG. 2 is a section view of a fluid machine forming an essential part of the power generation apparatus shown in FIG. 1.

As shown in FIG. 1 and FIG. 2, the power generation apparatus 10 converts the kinetic energy of a fluid (gas or liquid) to electrical energy. In the present embodiment, the power generation apparatus 10 is a so-called wind power generator, which converts the kinetic energy of wind (air) to electrical energy. As for the type of wind power generator, the power generation apparatus 10 can be employed, for example, in a small, medium or large structure.

The power generation apparatus 10 comprises a support portion 11, a housing portion 12, a power generation unit 13, a fluid machine 14 and an adjustment portion 15.

The support portion 11 is a tower (column) of the wind power generator, formed in the shape of a column that is erected on the ground. The support portion 11 supports the power generation unit 13 so as to be able to rotate about a yaw axis L0. The yaw axis L0 extends in a direction orthogonal to (intersecting) a rotational axis L1, to be discussed below. In the present embodiment, the yaw axis L0 is positioned on the axis of the support portion 11 and extends in the vertical direction.

The housing portion 12 is a nacelle (casing, housing) of the wind power generator. The housing portion 12 is supported on the support portion 11 so as to be able to rotate about the yaw axis L0.

The power generation unit 13 is housed in the housing 12 and positioned on the yaw axis L0. Since the power generation unit 13 is housed inside the housing 12, the support portion 11 supports the power generation unit 13, by way of the housing portion 12, so as to be able to rotate about the yaw axis L0. The power generation unit 13 comprises a power generation shaft 31. The power generation unit 13 converts kinetic energy that turns the power generation shaft 31 into electrical energy. In the present embodiment, the power generation unit 13 comprises a power generator 32, and the power generation shaft 31 is a portion of the power generator 32. The power generation unit 13 may further comprise a speed increaser. In this case, it is possible to employ a structure in which the power generation shaft 31 forms a portion of the speed increaser.

The fluid machine 14 converts the kinetic energy of wind to a rotational force on the power generation shaft 31 and thereby transmits the energy to the power generation shaft 31. The fluid machine 14 comprises a rotating shaft 41, a pair of rotors 42, a differential mechanism 43, a cover 44 and a nose cone 45.

The rotating shaft 41 extends parallel to the power generation shaft 31. In the present embodiment, the rotating shaft 41 is arranged coaxially with the power generation shaft 31. Hereinbelow, the common axis on which the axis of the power generation shaft 31 and the axis of the rotating shaft 41 are positioned will be referred to as the rotational axis L1. In the present embodiment, the rotational axis L1 extends horizontally.

An end of the rotating shaft 41 is coupled to the power generation shaft 31. An attachment portion 46, to which an end of the power generation shaft 31 is attached, is provided on the end of the rotating shaft 41. In the present embodiment, the attachment portion 46 is a female screw portion (recess) into which the power generation shaft 31 is screwed.

The fluid machine 14 mainly transmits, to the power generation shaft 31, the component of the wind kinetic energy that is received by the fluid machine 14 parallel to the rotational axis L1. Hereinbelow, there are cases in which the upwind side (upstream side) is referred to as the front side and the downwind side (downstream side) is referred to as the rear side. This power generation apparatus 10 is of the so-called passive-yaw type in which a fluid machine 14 that has received kinetic energy from the wind passively swings around in accordance with the direction of the fluid. Additionally, this power generation apparatus 10 is of the upwind type in which the fluid machine 14 (rotor 42) is positioned on the upwind side of the yaw axis L0. The rotating shaft 41 is positioned on the upwind side of the power generation shaft 31 and the attachment portion 46 is positioned on the end of the rotating shaft 41 on the downwind side.

The pair of rotors 42 are arranged so as to be spaced in the direction of the rotational axis L1. The rotors 42 are provided on the rotating shaft 41 so as to be able to rotate in the circumferential direction of the rotating shaft 41 (direction of rotation about the rotational axis L1). First bearings 47 are provided between the rotating shaft 41 and the rotors 42. The first bearings 47 allow the rotors to rotate with respect to the rotating shaft 41.

Each of the pair of rotors 42 comprise a blade 48 that receives kinetic energy from a fluid, and a hub 49 to which the blade 48 is fixed.

The hub 49 is formed in the shape of a ring that is arranged coaxially with the rotational axis L1. The rotating shaft 41 is disposed in the hub 49, and the first bearing 47 is provided between the rotating shaft 41 and the hub 49. A plurality of the blades 48 are arranged so as to be spaced in the circumferential direction of the rotating shaft 41. Three blades 48 are provided on each rotor 42, and there are six on the fluid machine 14 overall. The blades 48 are shown in simplified form in FIG. 1 and FIG. 3 to be explained below.

Of the pair of rotors 42, on the front rotor 42a (first rotor) that is positioned on the upwind side (one side in the rotational axis L1 direction), the blades 48 are provided on the upwind side of the hub 49. Of the pair of rotors 42, on the rear rotor 42b (second rotor) that is positioned on the downwind side (the other side in the rotational axis L1 direction), the blades 48 are provided on the downwind side of the hub 49. The pair of rotors 42 are arranged so that the blades 48 of the respective rotors sandwich both hubs 49.

The pair of rotors 42 rotate in the same direction upon receiving kinetic energy from the wind. The pair of rotors 42 may be configured so as to both rotate, for example, in the clockwise direction in a front view of the power generation apparatus 10 from the upwind side. The pair of rotors 42 are formed so as to rotate in the same direction upon receiving kinetic energy from the wind due to the shapes of the blades 48 on the rotors 42. In the illustrated example, the pair of rotors 42 are formed so as to have the same shape and be of the same size as each other.

The kinetic energy of wind tends to act more strongly on the front rotor 42a, which is positioned on the upwind side, than on the rear rotor 42b, which is positioned on the downwind side. For this reason, the front rotor 42a tends to rotate faster than the rear rotor 42b, and a difference tends to arise between the rotation speeds of the pair of rotors 42.

The differential mechanism 43 is provided between the pair of rotors 42, and combines the rotational force from each of the pair of rotors 42 and transmits the rotational force to the rotating shaft 41. The differential mechanism 43 comprises a transmission shaft 50, a pair of first gears 51 and a pair of second gears 52.

The transmission shaft 50 protrudes from the rotating shaft 41 in the radial direction of the rotating shaft 41 (radial direction of the rotational axis L1). The transmission shaft 50 is provided on the rotating shaft 41, at a portion positioned between the pair of rotors 42. In the present embodiment, the transmission shaft 50 penetrates through the rotating shaft 41 in the radial direction.

Although the pair of first gears 51 and the pair of second gears 52 are all bevel gears in the illustrated example, it is possible to employ other structures that are capable of converting motion by 90 degrees. The pair of first gears 51 are provided on both ends of the transmission shaft 50 so as to be able to rotate in the circumferential direction of the transmission shaft 50 (direction of rotation about the axis L2 of the transmission shaft 50). The pair of second gears 52 are provided so as to sandwich the transmission shaft 50 in the rotational axis L1 direction and are respectively fixed to the pair of rotors 42. The pair of second gears 52 mesh respectively with the pair of first gears 51 and thereby transmit the rotational force from each of the pair of rotors 42 to the transmission shaft 50. The second gears 52 may, for example, be formed separately from the rotors 42 and be fixed to the rotors 42 by being attached to the rotors 42 or the like. The second gears 52 may, for example, be fixed to the rotors 42 by being integrally molded with the rotors 42 or the like. The second gears 52 may, for example, be fixed to the rotors 42 by having the second gears 52 etched into the rotors 42 or the like.

The cover 44, which covers the differential mechanism 43, is fixed to one of the pair of rotors 42 and is separated from the other. The cover 44 is formed in the shape of a tube that extends in the rotational axis L1 direction, and covers the differential mechanism 43 from the outside in the radial direction of the rotating shaft 41. The cover 44 is fixed to the front rotor 42a and separated from the rear rotor 42b. The upwind end of the cover 44 buts against the blades 48 on the front rotor 42a from the downwind side, and fits over the hub 49 of the front rotor 42a from the outside in the radial direction. The downwind end of the cover 44 is separated, towards the upwind side, from the blade 48 of the rear rotor 42b, and is separated, in the radial direction, from the hub 49 of the rear rotor 42b.

The nose cone 45 covers the rotating shaft 41. The nose cone 45 covers the rotating shaft 41 from the upwind side in the rotational axis L1 direction. The nose cone 45 is fixed to the front rotor 42a and is formed in a conical shape projecting forward from the front rotor 42a.

The adjustment portion 15, upon receiving kinetic energy from the wind, rotates the power generation unit 13 about the yaw axis L0 so that the orientation of the fluid machine 14 corresponds to the wind direction. At this time, the adjustment portion 15 rotates the power generation unit 13 so that the rotational axis L1 is parallel to the wind flow direction and the fluid machine 14 is positioned further upwind than the yaw axis L0. The adjustment portion 15 converts the kinetic energy from the wind to rotational energy about the yaw axis L0. The adjustment portion 15 is the tail fin in an upwind-type wind power generator.

As described above, according to the fluid machine in the present embodiment, the fluid machine 14 comprises a differential mechanism 43. Therefore, the rotational force from each of the pair of rotors 42 can be efficiently transmitted to the power generation shaft 31 via the differential mechanism 43 and the rotating shaft 41, regardless of the rotation speed of each rotor 42. At this time, by transmitting the rotational forces from the rotors 42 to the power generation shaft 31 of a common power generation unit 13, the load (rotation resistance) from the power generation shaft 31 that acts on each rotor 42 can be kept low. As a result thereof, it is possible to achieve efficient power generation by means of the power generation unit 13.

When the rotors 42 rotate, the rotational force of the rotors 42 is transmitted to the rotating shaft 41 via the second gears 52, the first gear 51 and the transmission shaft 50.

In this case, when the rotation speeds of the pair of rotors 42 are the same, for example, during startup, the transmission shaft 50 transmits the rotational force of the rotating shaft 41 without the first gear 51 turning. Therefore, compared to the case in which there is just one rotor 42 rather than a pair, it is possible to transmit nearly twice the rotational force to the rotating shaft 41. As a result thereof, even if the kinetic energy of the wind received by the rotors 42 is small, the rotors 42 can more easily begin to turn. Therefore, this fluid machine 14 is provided with good startup properties.

On the other hand, when the rotation speeds of the pair of rotors 42 are different, for example, during high-speed rotation, the transmission shaft 50 transmits rotational force to the rotating shaft 41 with the first gear 51 rotating in the circumferential direction of the transmission shaft 50. Therefore, it is possible to keep the pair of rotors 42 from affecting the rotation speeds of each other. In other words, the pair of rotors 42 can be rotated at different rotation speeds in accordance with the kinetic energy received from the fluid by each rotor 42, with little energy loss. As a result thereof, it is possible to transmit a large rotational force to the rotating shaft 41.

Additionally, the differential mechanism 43 is provided between the pair of rotors 42, the rotating shaft 41 extends parallel to the power generation shaft 31, and an end of the rotating shaft 41 is coupled to the power generation shaft 31. Therefore, this fluid machine 14 can be employed in, for example, a so-called passive-yaw type power generation apparatus 10 in which the fluid machine 14 that has received kinetic energy from the wind passively swings around in accordance with the wind direction. Furthermore, for example, it is possible to employ this fluid machine 14 as an attachment in which the entire fluid machine 14 is appended to the power generation shaft 31 in an existing power generation apparatus 10. Thus, this fluid machine 14 can be employed in various types of power generation apparatus 10.

Additionally, the pair of rotors 42 rotate in the same direction upon receiving kinetic energy from the wind. Therefore, compared to the case in which the pair of rotors 42 counter-rotate, there is no need to provide, for example, further mechanisms for counter-rotation, so the structure can be simplified, and structures that are of the same shape and the same size (for example, common clockwise rotors 42) can be employed as the pair of rotors 42. As a result thereof, the cost can be reduced and the ease of maintenance can be improved.

Additionally, the pair of rotors 42 each comprise a blade 48 and a hub 49. Therefore, the number of blades 48 on each rotor 42 can be reduced while ensuring that there are a certain number of blades 48 in total in the fluid machine 14 overall. Therefore, the rotational force from each of the pair of rotors 42 can be transmitted to the power generation shaft 31 via the differential mechanism 43 (effect due to ensuring that there are a certain number of blades 48 in total in the fluid machine 14 overall), while also providing this fluid machine 14 with good startup properties. Furthermore, it can be made easier to raise the rotation speed during high-speed rotation of the rotors 42 (effect due to reducing the number of blades 48 in each rotor 42).

Additionally, the pair of rotors 42 are arranged so that the blades 48 of the respective rotors sandwich both hubs 49 in the rotational axis L1 direction. Therefore, the blades 48 of the pair of rotors 42 can be separated by a greater distance in the rotational axis L1 direction. As a result thereof, contact between the blades 48 can be more easily prevented.

Additionally, the cover 44 is fixed to one of the pair of rotors 42 and separated from the other. Therefore, it is possible, for example, to prevent unexpected interference between the cover 44 and the rotors 42, while the cover 44 protects the differential mechanism 43.

Additionally, the power generation apparatus 10 according to the present embodiment comprises the fluid machine 14, and can therefore generate power with high efficiency.

Furthermore, the power generation apparatus 10 has a so-called passive-yaw type structure comprising the support portion 11, so it is possible to obtain advantages such as cost, ease of maintenance and durability in comparison to so-called active-yaw type structures.

The technical scope of the present invention is not limited to the aforementioned embodiments, and various modifications may be made within a range not departing from the spirit of the present invention.

For example, it is possible to have no nose cone 45 or cover 44.

In the aforementioned embodiment, the blade 48 is provided on the upwind side of the hub 49 on the front rotor 42a, and the blade 48 is provided on the downwind side of the hub 49 on the rear rotor 42b, but the present invention is not limited thereto.

The pair of rotors 42 may rotate in opposite directions upon receiving kinetic energy from a fluid.

It is possible to provide three or more rotors 42, and to provide the differential mechanism 43 between a pair of rotors 42 lying adjacent to each other in the rotational axis L1 direction.

The transmission shaft 50 may be formed so as to be integrated with the rotating shaft 41, or may be formed as a separate element from the rotating shaft 41.

In the aforementioned embodiment, the transmission shaft 50 penetrates through the rotating shaft 41 in the radial direction of the rotational shaft 41, but the present invention is not limited to such a structure. For example, it is possible to provide a plurality of transmission shafts 50 that are spaced apart in the circumferential direction of the rotating shaft 41, and to provide a first gear 51 on each of the plurality of transmission shafts 50.

In the aforementioned embodiment, an attachment portion 46 is provided on an end of the rotating shaft 41, but the present invention is not limited to such a structure, and it is possible to employ another embodiment, as appropriate, in which the end of the rotating shaft 41 is coupled to the power generation shaft 31. For example, the rotating shaft 41 and the power generation shaft 31 may be formed in an integrated manner.

Figure 3:
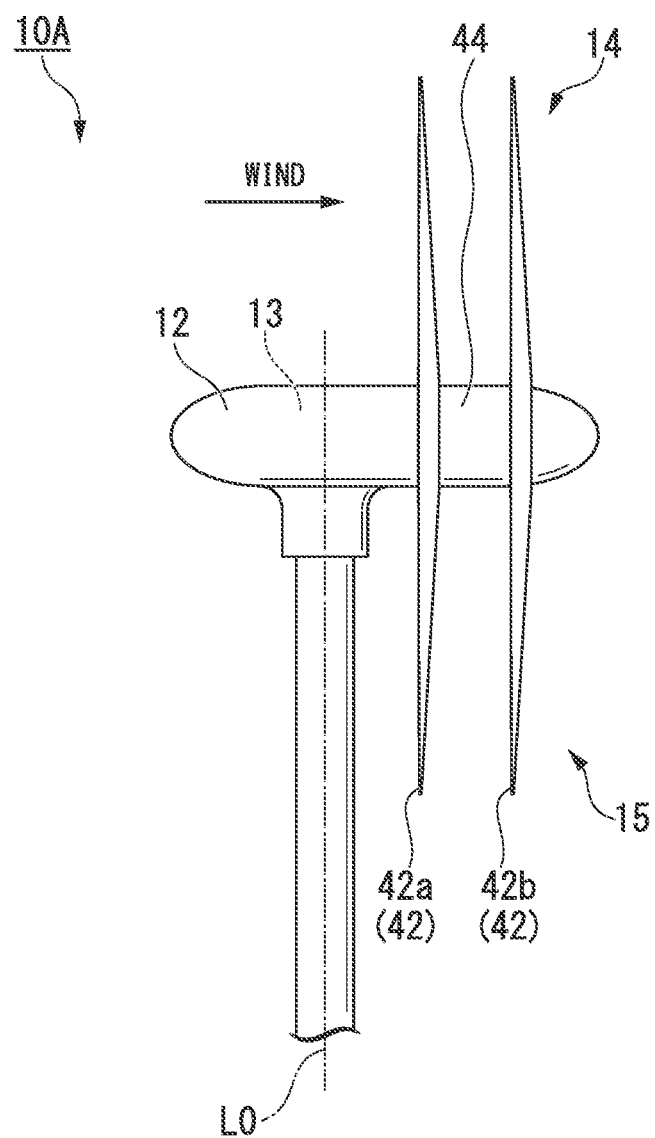
FIG. 3 is a side view of a power generation apparatus according to a first modified example of the present invention.

The power generation apparatus 10 is not limited to being an upwind type, and may be a downwind type as shown in FIG. 3. In this power generation apparatus 10A, the fluid machine 14 is positioned on the downwind side of the yaw axis L0 and this fluid machine 14 also serves as an adjustment portion 15. In other words, when the rotors 42 (blades 48) receive kinetic energy from the wind, the kinetic energy from the wind is converted to rotational energy about the yaw axis L0 and the power generation unit 13 is rotated about the yaw axis L0 so that the orientation of the fluid machine 14 in aligned with the wind direction.

The power generation apparatus 10 is not limited to being of the passive-yaw type and may be of the so-called active-yaw type comprising a control unit that controls the direction of the fluid machine 14 based on the power.

Figure 4:
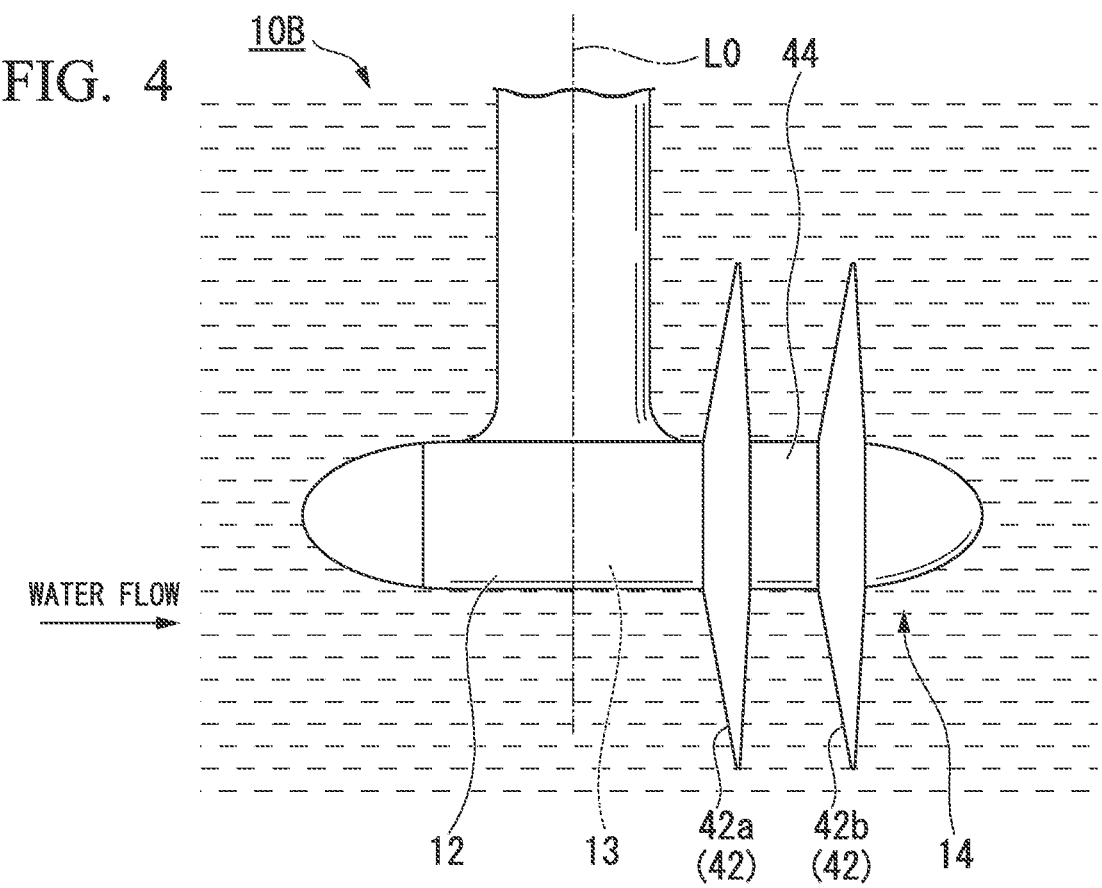
FIG. 4 is a side view of a power generation apparatus according to a second modified example of the present invention.

In the aforementioned embodiment, the power generation apparatus 10 converts the kinetic energy of wind to electrical energy, but the present invention is not limited thereto. For example, it may convert the kinetic energy of water flow (liquid) to electrical energy, as in the power generation apparatus 10B illustrated in FIG. 4.

Next, evaluation tests for the above-mentioned functions and effects were performed.

For the evaluation tests, two power generation apparatuses were prepared, i.e. an example and a comparative example. In the example, the power generation apparatus 10 illustrated in FIG. 1 and FIG. 2 was employed. In the comparative example, a structure in which the fluid machine 14 in the power generation apparatus 10 in FIG. 1 and FIG. 2 was replaced with a rotor for rotating the power generation shaft upon receiving kinetic energy from the wind was employed. In both the example and the comparative example, the diameter of the rotor was 1.8 m and the rated power output was 600 W.

The power generation apparatuses of the example and the comparative example were installed on an automobile, this automobile was driven, and the wind speed on the rotors and the power (current and voltage) generated by the power generation apparatuses were measured.

Figure 5:
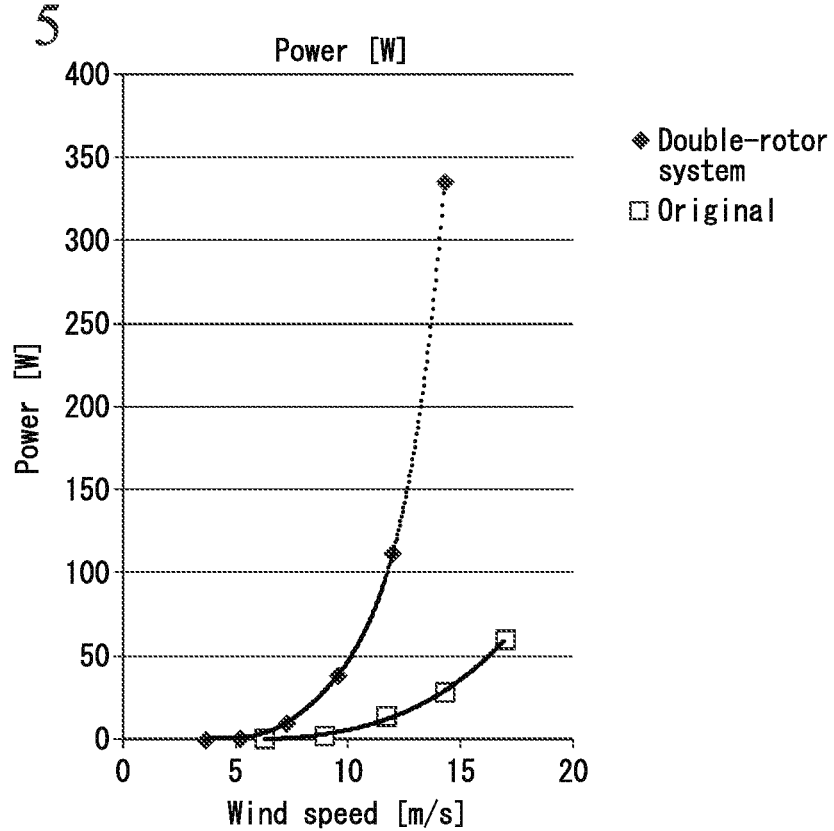
FIG. 5 is a graph showing electric power measurement results in an evaluation test of the present invention.
Figure 6:
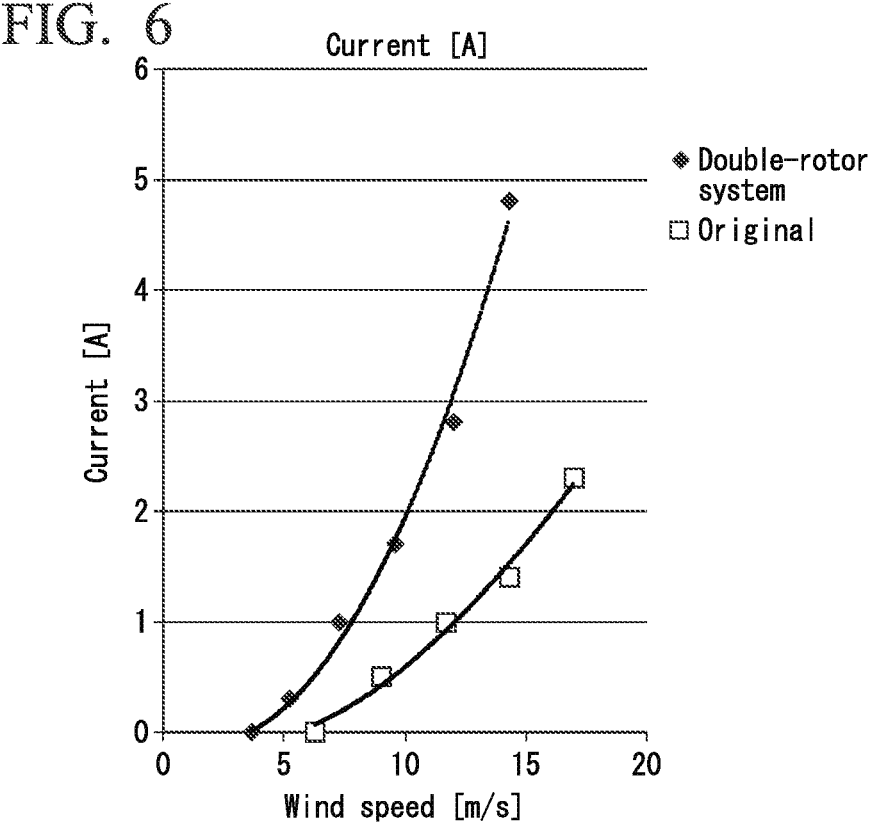
FIG. 6 is a graph showing electric current measurement results in an evaluation test of the present invention.
Figure 7:
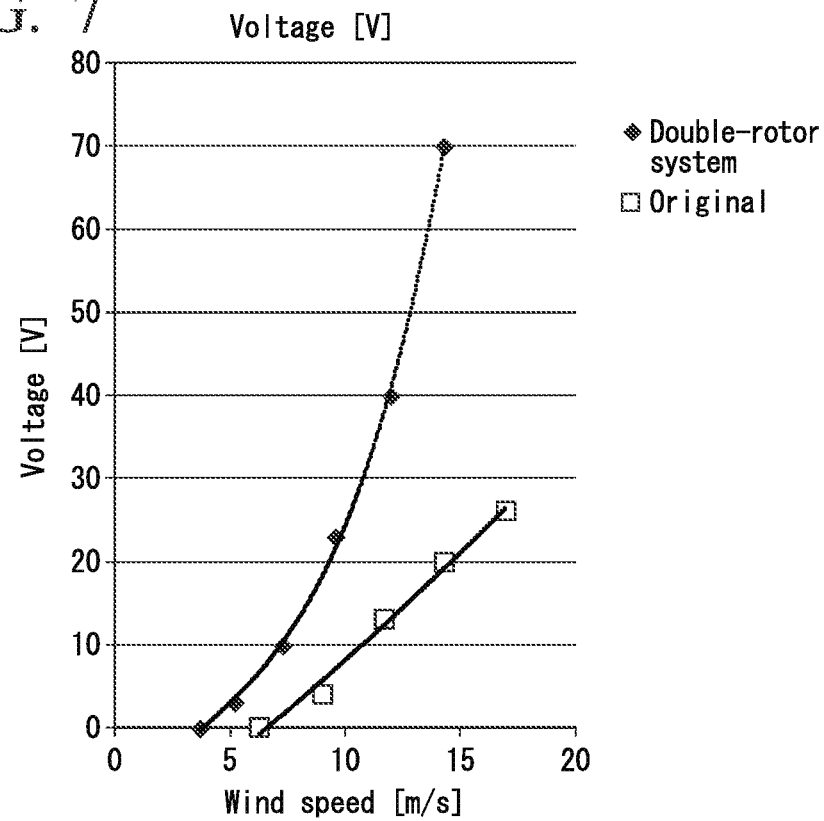
FIG. 7 is a graph showing voltage measurement results in an evaluation test of the present invention.

The results are shown in Table 1 and in FIG. 5 to FIG. 7. In Table 1 and FIG. 5 to FIG. 7, "Double-rotor system" refers to the example and "Original" refers to the comparative example.

TABLE 1

| Double-rotor system | | | | Original | | | |
| --- | --- | --- | --- | --- | --- | --- | --- |
| Wind speed [m/s] | Current [A] | Voltage [V] | Power [W] | Wind speed [m/s] | Current [A] | Voltage [V] | Power [W] |
| 3.7 | 0 | 0 | 0 | | | | |
| 5.2 | 0.3 | 3 | 0.9 | 6.3 | 0 | 0 | 0 |
| 7.3 | 1 | 10 | 10 | 9 | 0.5 | 4 | 2 |
| 9.6 | 1.7 | 23 | 39.1 | 11.7 | 1 | 13 | 13 |
| 12 | 2.8 | 40 | 112 | 14.3 | 1.4 | 20 | 28 |
| 14.3 | 4.8 | 70 | 336 | 17 | 2.3 | 26 | 59.8 |

From these results, it was confirmed that, in the example, power started being generated at a lower wind speed than in the comparative example. Additionally, it was confirmed that, for similar wind speeds, the power was higher in the example than in the comparative example.

INDUSTRIAL APPLICABILITY

The present invention can be employed in various types of power generation apparatus.

REFERENCE SIGNS LIST 10, 10A, 10B Power generation apparatus
11 Support portion
13 Power generation unit
14 Fluid machine
31 Power generation shaft
32 Power generator
41 Rotating shaft
42 Rotor
43 Differential mechanism
44 Cover
48 Blade
49 Hub
50 Transmission shaft
51 First gear
52 Second gear
L0 Yaw axis
L1 Rotational axis

What is claimed is:

1. A fluid machine comprising:
   a rotating shaft that extends parallel to a power generation shaft of a power generation unit, wherein an end of the rotating shaft is coupled to the power generation shaft;
   a plurality of rotors provided on the rotating shaft capable of rotating in a circumferential direction of the rotating shaft, which are arranged so as to be spaced in a rotational axis direction parallel to the axis of the rotating shaft;
   a differential mechanism that is provided between a pair of rotors lying adjacent to each other in the rotational axis direction, and that combines the rotational force from each of the pair of rotors and transmits the rotational force to the rotating shaft; and
   a cover that covers the differential mechanism and that is fixed to one of the pair of rotors and separated from the other,
   wherein a downwind end of the cover is separated in a radial direction from a rear rotor of the pair of rotors, and
   wherein the cover is fixed to a front rotor of the pair of rotors and separated from a rear rotor of the pair of rotors.

2. The fluid machine according to claim 1, wherein the differential mechanism comprises:
   a transmission shaft that protrudes from the rotating shaft in the radial direction of the rotating shaft;
   a first gear that is provided on the transmission shaft capable of rotating in a circumferential direction of the transmission shaft; and
   a pair of second gears that are provided so as to sandwich the transmission shaft in the rotational axis direction and are respectively fixed to the pair of rotors, and that mesh with the first gear to transmit the rotational force from each of the pair of rotors to the transmission shaft.

3. The fluid machine according to claim 1, wherein the plurality of rotors rotate in the same direction upon receiving kinetic energy from a fluid.

4. The fluid machine according to claim 1, wherein:
   each of the plurality of rotors comprises a blade that receives kinetic energy from a fluid, and a hub to which the blade is fixed; and the pair of rotors are arranged so that the blades of the respective rotors sandwich both hubs in the rotational axis direction.

5. A power generation apparatus comprising:
the fluid machine according to claim 1; and
a power generation unit comprising the power generation shaft to which the end of the rotating shaft is coupled.

6. The power generation apparatus according to claim 5, further comprising:
a support portion that supports the power generation unit so as to be able to rotate about a yaw axis extending in a direction intersecting the axis of the power generation shaft; and
the fluid machine, after receiving kinetic energy from the fluid, passively swings around in accordance with the direction of the fluid.

\* \* \* \* \*